US007658475B2

(12) United States Patent
Inoue

(10) Patent No.: US 7,658,475 B2
(45) Date of Patent: Feb. 9, 2010

(54) PIEZOELECTRIC ELEMENT, DROPLET-EJECTING HEAD, DROPLET-EJECTING APPARATUS, AND METHOD OF PRODUCING A PIEZOELECTRIC ELEMENT

(75) Inventor: Nanao Inoue, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 421 days.

(21) Appl. No.: 11/404,648

(22) Filed: Apr. 14, 2006

(65) Prior Publication Data

US 2007/0070128 A1 Mar. 29, 2007

(30) Foreign Application Priority Data

Sep. 27, 2005 (JP) ............................ 2005-280500

(51) Int. Cl.
*B41J 2/045* (2006.01)
*H02K 39/00* (2006.01)

(52) U.S. Cl. ........................................ 347/68; 310/311

(58) Field of Classification Search .................. 347/68, 347/70–72; 310/311

See application file for complete search history.

(56) References Cited

U.S. PATENT DOCUMENTS

| | | | | |
|---|---|---|---|---|
| 6,154,239 | A * | 11/2000 | Chatterjee et al. | 347/68 |
| 6,407,481 | B1 * | 6/2002 | Takeuchi et al. | 310/324 |
| 6,903,491 | B2 * | 6/2005 | Irie et al. | 310/328 |
| 6,929,355 | B2 * | 8/2005 | Matsuzawa | 347/71 |
| 7,090,323 | B2 * | 8/2006 | Takatsuka | 347/17 |

FOREIGN PATENT DOCUMENTS

| | | |
|---|---|---|
| JP | 2003-154646 | 5/2003 |

* cited by examiner

*Primary Examiner*—An H Do
(74) *Attorney, Agent, or Firm*—Fildes & Outland, P.C.

(57) ABSTRACT

The present invention provides a piezoelectric element including a piezoelectric body and top and bottom electrodes holding the piezoelectric body therebetween, wherein an interlayer dielectric having an opening that defines an active area of the piezoelectric body is interposed between the piezoelectric body and the top electrode, and the top electrode is layered directly on the piezoelectric body in the active area of the piezoelectric body.

13 Claims, 13 Drawing Sheets

46A
48B
52

54A
54
46
48
54

50

56
56A

62

58
52A
52B

PIEZOELECTRIC ELEMENT, DROPLET-EJECTING HEAD, DROPLET-EJECTING APPARATUS, AND METHOD OF PRODUCING A PIEZOELECTRIC ELEMENT

CROSS-REFERENCE TO RELATED APPLICATION

This application claims priority under 35 USC 119 from Japanese Patent Application No.2005-280500, the disclosure of which is incorporated by reference herein.

BACKGROUND OF THE INVENTION

1. Field of the Invention

The present invention relates to a droplet-ejecting apparatus such as an inkjet-recording apparatus. It also relates to a piezoelectric element for use in the droplet-ejecting apparatus, a method of preparing the same, and a droplet-ejecting head using the same.

2. Description of the Related Art

Inkjet-recording apparatus is one of the conventional droplet-ejecting apparatuses for printing by ejecting droplets from multiple nozzles onto a recording medium such as paper, and has various advantages such as smaller size, low price, and lower noise, and is commercially available. In particular, a recording apparatus using a piezoelectric method that ejects an ink droplet by changing the pressure in a pressure chamber by using a piezoelectric element, and a recording apparatus using a thermal method that ejects an ink droplet by expanding ink by heat energy have many advantages such as high printing speed and high-resolution image.

Piezoelectric bodies used in the piezoelectric method occupy a greater area relative to those of ejection elements (heating units) used in the thermal method, and thus, it is difficult to increase the density and the length of the recording head. For that reason, a configuration of the piezoelectric elements arranged in a grid pattern is now being studied. However, the piezoelectric bodies for use in the piezoelectric method are normally composed of sintered materials, and sintered materials conventionally used did not have sufficiently high piezoelectric property, and as a result, a greater element area is needed.

In contrast, piezoelectric bodies formed by deposition methods such as vapor growth methods and liquid phase growth methods are superior in crystallinity and orientation and have a higher piezoelectric property compared with sintered materials, and thus, reduction in area and increase in density and length are expected. The formation methods of piezoelectric bodies by the deposition methods are highly suitable for common semiconductor processes and large-area electronic device processes, in which Si substrates and glass substrates are used.

On the other hand, the piezoelectric element in an inkjet-recording head demands a greater displacement of a diaphram for increase in the ink drop volume, and thus, a thick piezoelectric film having a thickness of 5,000 Å or more is needed.

As described, for example, in JP-A No. 2003-154646, piezoelectric elements generally have a sandwich structure wherein the piezoelectric body is held between a pair of top and bottom electrodes, and have the following problems:

First, in the piezoelectric body area including the piezoelectric body active area (active area where recording liquid is displaced in a pressure chamber), the area other than the piezoelectric body active area also operates and consumes wasteful energy. When a piezoelectric body is wired as it is in the sandwich structure wherein the piezoelectric body is held between the top and bottom electrodes, capacitance according to the wiring length is added, causing a problem of variation and increase in the capacitance for each piezoelectric body. In particular, increase in the capacitance of piezoelectric bodies that have a high dielectric constant of several hundreds or more is significant. In addition, the variation in the capacitance of each piezoelectric body leads to fluctuation in the energy applied to the piezoelectric body, so that it is difficult to maintain the uniform ink ejecting property-from the entire head. The fluctuation in the capacitance of each bit is a serious problem, particularly in piezoelectric elements having a two-dimensional configuration wherein piezoelectric bodies are arranged in a grid pattern for increase in density and length.

In addition, there are the following problems, in forming such a thick piezoelectric film by a vapor- or liquid-phase growth method:

First, when a piezoelectric body is deposited on an area having an amorphous underlayer, the perovskite-phase crystallization temperature needed for piezoelectric property (temperature needed to form the perovskite crystal phase) increases by approximately 50 to 100° C.

Further, when a piezoelectric body is deposited in an area having an amorphous underlayer, amorphous phase and mixed crystals of perovskite and pyrochlore phases are often formed, so that this process is not suitable for forming a uniform piezoelectric body.

Further, the piezoelectric body layer is occasionally separated or cracked in the area having an amorphous underlayer.

The phenomena described above tend to become marked with increase in thickness of the piezoelectric body.

SUMMARY OF THE INVENTION

The present invention has been made in view of the above circumstances and provides a piezoelectric element and a method of producing a piezoelectric element.

According to an aspect of the invention, a piezoelectric element includes a piezoelectric body and top and bottom electrodes holding the piezoelectric body therebetween, wherein an interlayer dielectric is interposed between the piezoelectric body and the top electrode in an area other than the active area of the piezoelectric body, and the top electrode is layered directly on the piezoelectric body in the active area of the piezoelectric body.

According to another aspect of the invention, a method of producing a piezoelectric element includes:

forming an electro-conductive crystalline layer, forming a deposition layer on the crystalline layer by a vapor- or liquid-phase growth method, and patterning the crystalline layer and the deposition layer, to thereby sequentially form a bottom electrode made of the crystalline layer and a piezoelectric body made of the deposition layer;

forming an interlayer dielectric layer on the bottom electrode and the piezoelectric body followed by patterning an opening in the interlayer dielectric layer at a position in the active area of the piezoelectric body; and forming an electro-conductive layer on the interlayer dielectric layer as well as on the piezoelectric body exposed at the opening of the interlayer dielectric layer followed by patterning the electro-conductive layer to form an top electrode made of the electro-conductive layer.

According to another aspect of the invention, a method of producing a piezoelectric element includes:

forming an electro-conductive crystalline layer, forming a deposition layer on the crystalline layer by a vapor- or liquid-phase growth method, and patterning the crystalline layer and the deposition layer, to thereby sequentially form a bottom electrode made of the crystalline layer and a piezoelectric body made of the deposition layer;

forming an interlayer dielectric layer on the bottom electrode and the piezoelectric body followed by patterning an opening in the interlayer dielectric layer at a position in the active area of the piezoelectric body as well as an opening in the interlayer dielectric layer at a position in an electrical connection area where an top electrode is to be connected to a wiring; and forming an electro-conductive layer on the interlayer dielectric layer as well as on the piezoelectric body exposed at the openings of the interlayer dielectric layer followed by patterning the electro-conductive layer to form the top electrode made of the electro-conductive layer.

BRIEF DESCRIPTION OF THE DRAWINGS

Preferred embodiments of the present invention will be described in detail based on the following figures, wherein.

DETAILED DESCRIPTION OF THE INVENTION

Hereinafter, the present invention will be described with reference to drawings. The same numbers are allocated to members having substantially the same functions in all drawings, and duplicated description is often omitted. In the following embodiments, description of the configuration of ink (liquid) channel is omitted.

FIRST EMBODIMENT

Figure 1:
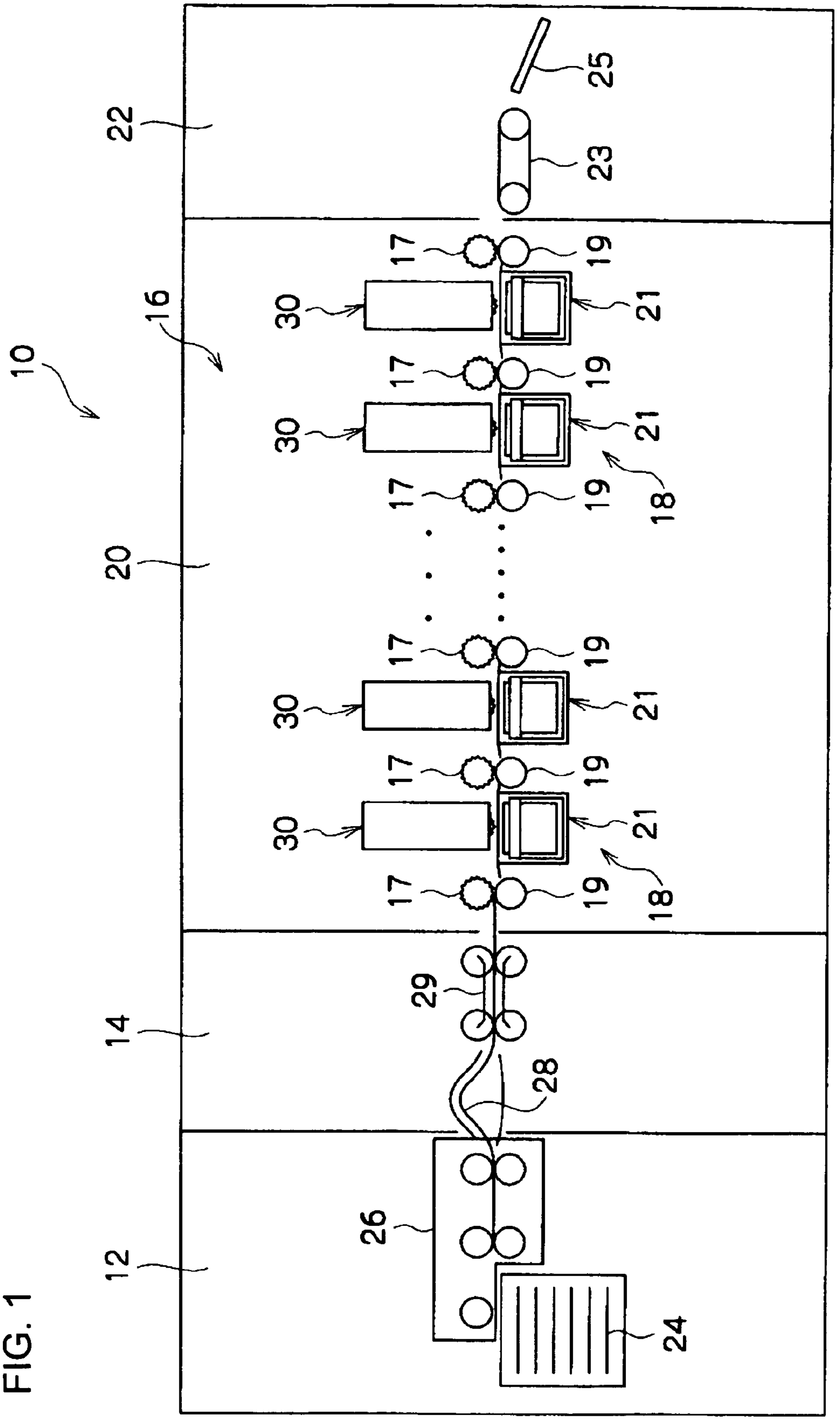
FIG. 1 is a schematic configurational view illustrating an inkjet-recording apparatus according to the first embodiment.
Figure 2:
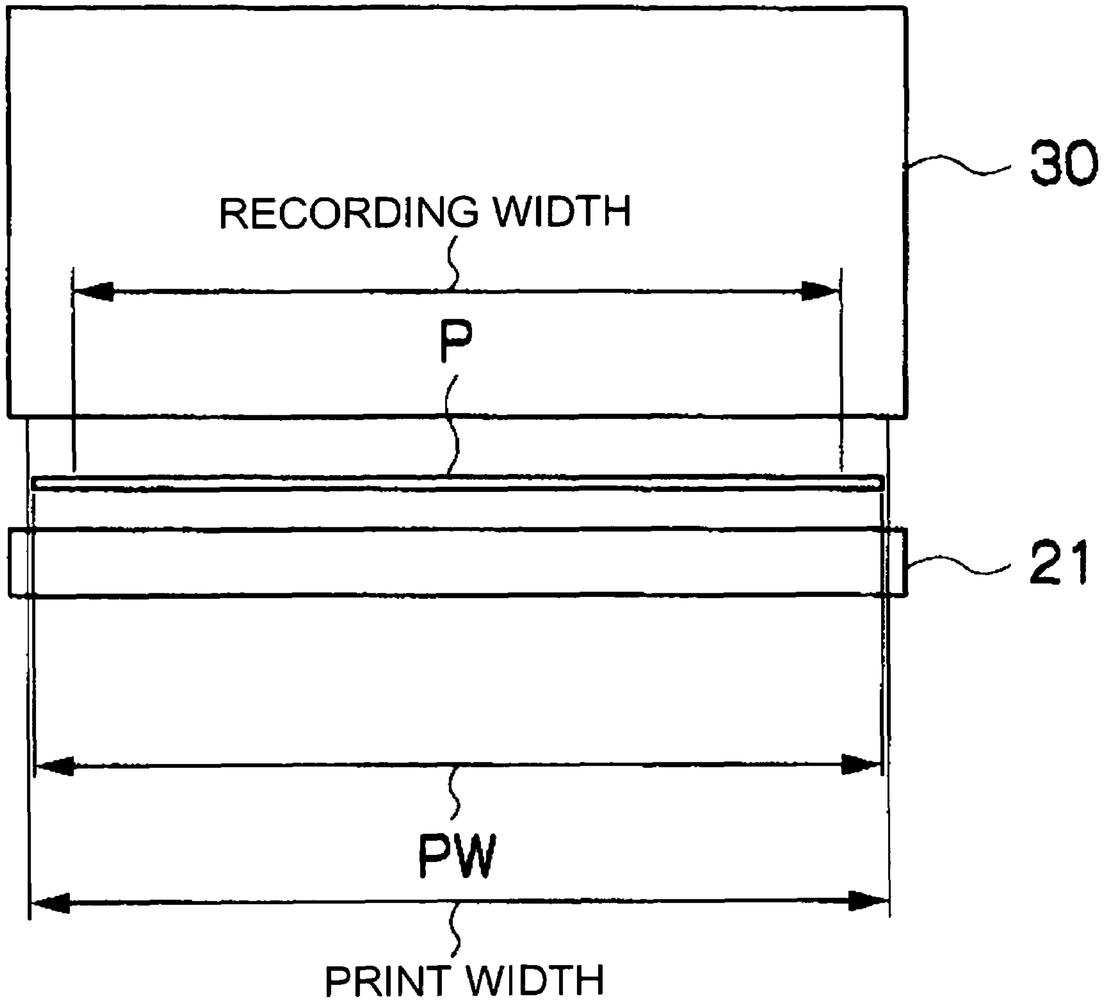
FIG. 2 is a view illustrating the print width by the inkjet-recording unit according to the first embodiment.

FIG. 1 is a schematic configurational view of an inkjet-recording apparatus according to the first embodiment. FIG. 2 is a view illustrating the print width by the inkjet-recording unit according to the first embodiment.

Referring to FIG. 1, an ink jet recording apparatus 10 (droplet ejecting apparatus) according to the present embodiment is basically composed of a recording medium (paper sheet) supplying section 12 for feeding recording media (paper sheets); a registration adjustment section 14 for controlling the posture of the recording media (paper sheets); a recording section 20 including a recording head section 16 for forming images on a recording medium P by ejecting ink droplets (liquid droplets), and a maintenance section 18 for performing maintenance of the recording head 16; and a discharging section 22 for discharging the recording media (paper sheets) on which the images have been formed in the recording section 20.

The recording medium (paper sheet) supplying section 12 is composed of a stocker 24 in which the recording media (paper sheets) are stacked and stocked, and a transportation apparatus 26 for feeding the recording media (paper sheets) one by one from the stocker 24 and transporting the recording media (paper sheets) to the registration adjustment section 14.

The registration adjustment section 14 includes a loop forming section 28 and a guide member 29 for controlling the posture of the recording media (paper sheets). When the recording media (paper sheets) pass through this part, the skew of the recording media (paper sheets) is corrected by the use of the elasticity of the recording media (paper sheets), and the recording media (paper sheets) proceed into the recording section 20 with control of the transportation timing.

In the discharging section 22, the recording media (paper sheets) on which the images have been formed by the recording section 20 are stored into a tray 25 via a medium (paper) discharging belt 23.

A recording medium (paper sheet) transportation passageway is formed between the recording head 16 and the maintenance section 18 for transporting the recording medium P. The recording medium P is continuously (without stopping) transported while the recording medium P is being sandwiched between a star wheel 17 and a transportation roll 19. Ink droplets are ejected from the recording head section 16 to this recording medium (paper sheet), whereby an image is formed on the recording medium P.

The maintenance section 18 is composed of a maintenance apparatus 21 that is disposed opposite to the ink jet recording unit 30 (recording head 32), and can perform processes such as capping, wiping, dummy jetting, and evacuating for the ink jet recording unit 30 (recording head 32).

Each of the ink jet recording units 30 includes one or plural ink jet recording heads 32. When including plural ink jet recording heads 32 (although not shown), these heads are arranged in a direction perpendicular to the recording medium (paper sheet) transportation direction. By ejecting ink droplets from the nozzles (not shown) of the recording head 32 to the recording medium P that is transported continuously in the recording medium (paper sheet) transportation passageway, an image is formed on the recording medium P. Here, at least four ink jet recording units 30 are provided, for example, corresponding to each color of yellow, magenta, cyan, and black for recording a so-called full-color image.

Referring to FIG. 2, the print width by each ink jet recording unit 30 is set to be longer than the maximum recording medium width (maximum paper sheet width PW) of the recording medium P on which an image is assumed to be recorded by this ink jet recording apparatus 10, whereby an image can be formed over the total width of the recording medium P without moving the ink jet recording unit 30 in a recording medium (paper sheet) width direction (i.e. a so-called full width array (FWA)). Here, the print width is basically the maximum of the recording width obtained by subtracting a margin, where printing is not carried out, from the both ends of the recording medium (paper sheet). However, the print width is generally set to be larger than the maximum width of the recording medium to be printed (maximum paper sheet width PW). This is because there may be a case where the recording medium (paper sheet) is transported while being tilted (skewed) at a certain angle to the transportation direction, and that there is a high demand for borderless prints.

Figure 3:
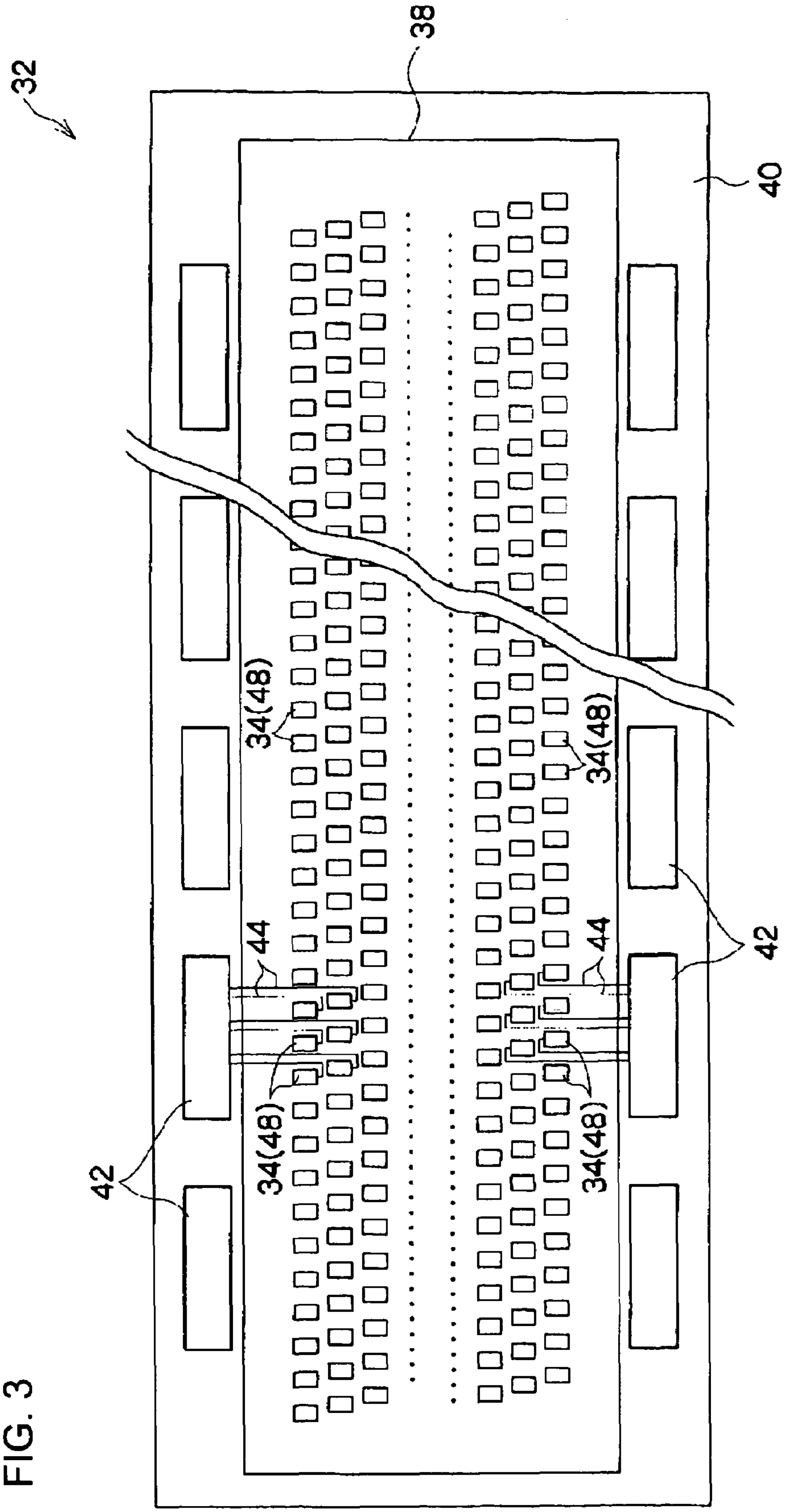
FIG. 3 is a bottom view of the inkjet-recording head according to the first embodiment.
Figure 4:
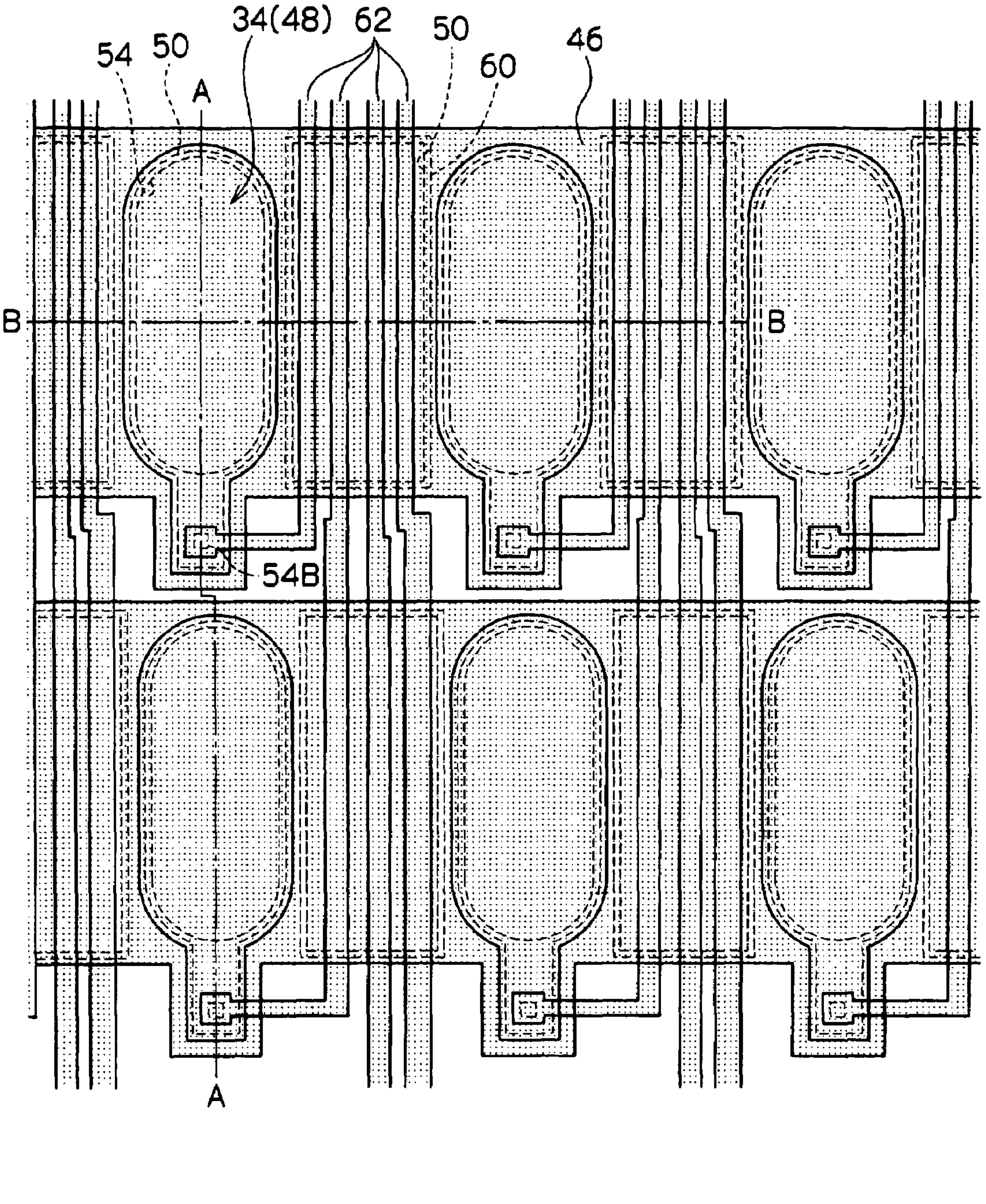
FIG. 4 is a partial magnified top view illustrating the area around the piezoelectric body in the inkjet-recording head according to the first embodiment.
Figure 5:
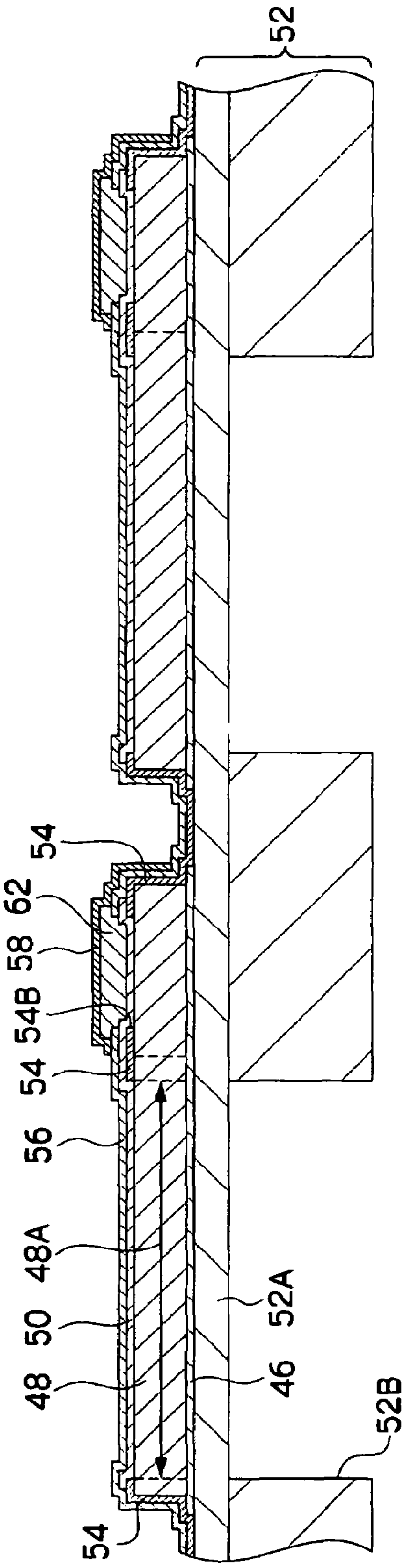
FIG. 5 is a cross-sectional view along the line A-A in FIG. 4.
Figure 6:
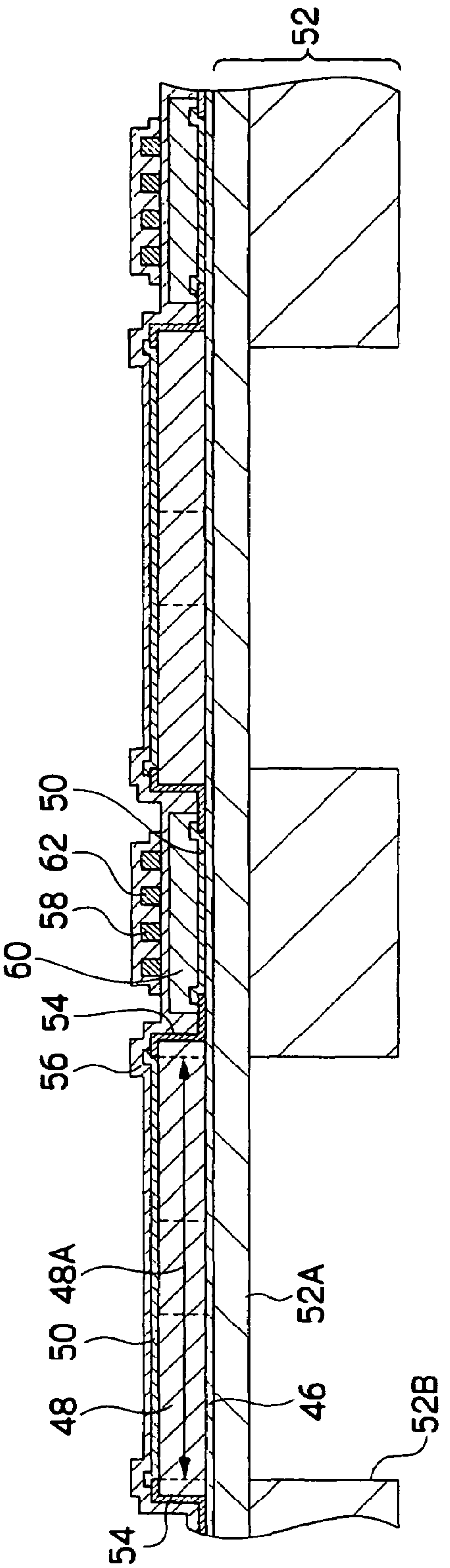
FIG. 6 is a cross-sectional view along the line B-B in FIG. 4.

Hereinafter, the inkjet-recording head 32 in the inkjet-recording unit 30 will be described in detail. FIG. 3 is a bottom view of the inkjet-recording head according to the first embodiment. FIG. 4 is a partial magnified top view illustrating the area around the piezoelectric body in the inkjet-recording head according to the first embodiment. FIG. 5 is a cross-sectional view along the line A-A in FIG. 4. FIG. 6 is a cross-sectional view along the line B-B in FIG. 4. In FIG. 4, common electrode 46, piezoelectric body 48, and signal wiring 62 are represented by solid lines, while other members are represented by dotted lines, for easy understanding. The same will be applied hereinafter.

As shown in FIG. 3, the inkjet-recording head 32 has piezoelectric elements 34 (piezoelectric bodies 48) arranged in a grid pattern, for example, of 2,560 bits (e.g., 8 lines×320 rows)(in the configuration wherein respective lines are phase shifted), and respective lines are shifted with respect to each other by 21 ram along the row direction (along the recording medium P). This configuration allows a resolution of 1,200 dpi.

At both end portions, in the width direction, of the piezoelectric body group configured by the piezoelectric elements 34 of 2,560 bits, a plurality of drive chips 42 are provided at the same interval along the longitudinal direction of the support substrate 40.

An extension wiring 44 connected to the signal electrode 50 (signal wiring 62) of each piezoelectric element 34 extends in the direction (width direction) orthogonal to the longitudinal direction of the support substrate 40 and finally is electrically connected while fitted to the pitch of the pad of the drive chip 42. For shortening the wire length of the extension wiring 44, it is preferable to divide the piezoelectric elements 34 into two groups in the width direction of the support substrate 40 and make the extension wiring 44 extend along the width direction of the support substrate 40.

An image with 1,200 dpi is formed on the recording medium P by arranging the piezoelectric elements 34 in a grid pattern of 2,560 bits, shifting the piezoelectric elements 34 in each line by 21 μm along the row direction, and allowing the recording medium P to pass the inkjet-recording head 32 once; but it is not always necessary to shift the piezoelectric elements 34 in each line along the row direction (or to make staggered lines of the piezoelectric elements 34).

For example, it is also possible to make the inkjet-recording head 32 movable along the width direction of the recording medium P being transported, and shift the relative position of the inkjet-recording head 32 after each passage of the recording medium P on the inkjet-recording head 32, thereby obtaining a desirable resolution with n passages of the recording medium P.

As shown in FIGS. 4 to 6, in the inkjet-recording heads 32, the piezoelectric elements 34 (piezoelectric bodies 48) are arranged in a grid pattern of 2,560 bits (8 lines×320 rows), and respective lines are shifted with respect to each other, for example by 21 μm, along the row direction.

The piezoelectric elements 34 are formed on a substrate 52 having a vibrating plate (diaphragm), and a common electrode 46 (bottom electrode), a piezoelectric body 48, and a signal electrode 50 (top electrode) are laminated in this order thereon. In FIGS. 5 and 6, 52A represents a diaphragm, and 52B represents an ink (liquid) pressure chamber.

A first interlayer dielectric layer 54 is formed on the upper surface (signal electrode 50—side surface) of the piezoelectric body 48 except in the active area 48A of the piezoelectric body 48 (active area where piezoelectric body 48 displaces ink (liquid) in the pressure chamber), and the first interlayer dielectric layer 54 is present between the piezoelectric body 48 and signal electrode 50 except in this area. In addition, the first interlayer dielectric layer 54 extends to and covers the side face of the piezoelectric body, and also covers portions of the common electrode 46 having no piezoelectric body 48 formed thereon.

The first interlayer dielectric layer 54 has an opening in the electrical connection area described below, where the signal electrode 50 and the signal wiring 62 are electrically connected, in the non-active area of the piezoelectric body 48, and the piezoelectric body 48 and the signal electrode 50 are electrically connected to each other through the opening. Further, the first interlayer dielectric layer 54 has an opening for electrical connection between the common electrode 46 and the common wiring 60 in the non-active area of the piezoelectric body 48, and the common electrode 46 and the common wiring 60 are electrically connected via a signal electrode 50 through the opening.

On the other hand, a second interlayer dielectric layer 56 is formed on the surface (at the opposite side to piezoelectric body 48) of the signal electrode 50 and on the surface of the common wiring 60 electrically connected to the common electrode 46 described below. In addition, a protective layer 58 is formed on the surface of the signal wiring 62 electrically connected to the signal electrode 50 described below. However, the protective layer 58 is formed only on the area other than the active area 48A of the piezoelectric body 48 and covers only the signal wiring 62.

Hereinafter, the common electrode 46 and the signal electrode 50 will be described. The common electrodes 46 are respectively formed in each line of the piezoelectric bodies 48, and are common in each 320 bits of the piezoelectric bodies 48. The common electrode 46 is connected to common wirings 60, which are formed at a layer position different therefrom, in the non-active area of the piezoelectric body 48. The common wiring 60 reduces the electric current density in the common electrode and prevents deterioration of the electrode material. The common wiring 60 may be formed separately from the common electrode 46, and it is possible to reduce the wiring resistance sufficiently by using a material having a resistivity of 10 μΩcm or less such as Al, Cu, or Ag as the electrode material.

On the other hand, a signal electrode 50 is formed for each piezoelectric body 48, and is connected to the signal wiring 62, which is formed at a layer position different therefrom, in the non-active area of the piezoelectric body 48. The signal wiring 62 may be formed separately from the common electrode 46, and it is possible to reduce the wiring resistance sufficiently by using a material having a resistivity of 10 μΩcm or less such as Al, Cu, or Ag as the electrode material.

Although not shown in the figures, the common wiring 60 and the signal wiring 62 are extended and respectively connected to the extension wirings 44 (refer to FIG. 3) through the pads provided in the openings formed in the first interlayer dielectric layer 54 and the second interlayer dielectric layer 56, and to the drive chip 42 via the wirings.

The common electrode 46, the common wiring 60 and the signal wiring 62 are laminated respectively via an adsorption layer (e.g., Ti 100 Å), although not shown in the figures.

In addition, the common wiring 60 and the signal wiring 62 are formed at layer positions different from each other (laminated via the second interlayer dielectric layer 56), which allows arrangement of the piezoelectric bodies 48 in a grid pattern (in the configuration wherein respective lines are phase shifted, however) for high pixel density. Although not shown in the figures, the signal wirings 62 for respective lines of the piezoelectric bodies 48 may be formed at different layer positions, for high pixel density and for reduction in wiring resistance.

The common electrode 46 is made of a crystalline layer. Examples of the crystalline layers include crystalline metal layers and crystalline electro-conductive metal-oxide layers (crystalline oriented layers). The crystalline layer means a thin film layer of a crystalline material in the cubic system such as simple cubic system, body-centered cubic system, and face-centered cubic system; in the tetragonal crystalline system such as simple tetragonal system and body-centered tetragonal system; in the orthorhombic system such as simple orthorhombinc system, body-centered orthorhombic system, one-face-centered orthorhombic system, and face-centered orthorhombic system; in the rhombohedral system; in the hexagonal system; in the monoclinic system such as simple monoclinic system and one-face-centered monoclinic system; or in the triclinic system. The crystalline metal layer is a layer of a metal, metal nitride, metal silicide, or metal boride, which forms any one of the crystal systems above. The crystalline electro-conductive metal-oxide layer is a layer of an electro-conductive oxide having any one of the crystal systems above.

Typical examples of the materials for the crystalline layer are listed below.

—Crystalline Metal Layer—

Noble metals (e.g., Au, Ag, Ru, Rh, Pd, Os, Ir, Pt, etc.)

Noble metal oxides (e.g., $IrO_2$, $RuO_2$, etc.), high-melting point metals (e.g., α-Ta (bcc-Ta), bcc-V, bcc-Nb, bcc-Mo, bcc-W, hcp-Ti, hcp-Zr, hcp-Hf, TaMo, TaTi, TiAl, β-Ta, bcc-Ti, bcc-Zr, bcc-Ti, bcc-Zr, etc.), and Metal nitrides, metal silicides, and metal borides (e.g., $Ta_2N$, $TaN_{0.1}$, $TaN_{0.8}$, TaN, $Ta_6N_{2.57}$, $Ta_4N$,
$TaB_2$, TaB,
$TaSi_2$, $Ta_5Si$, β-$Ta_5Si_3$, α-$Ta_5Si_3$, $Ta_2Si$, $Ta_3Si$, $Ta_4Si$, $Ta_{3.28}Si_{0.72}$,
VN, $V_2N$, $V_6N_{2.7}$, $VN_{0.2}$, $VN_{0.35}$, $VB_2$, $V_{1.54}B_{50}$,
$VSi_2$, $V_3Si$, $V_5Si_3$,
$Nb_2N$, NbN, $NbN_{0.95}$, $Nb_{4.62}N_{2.14}$, $Nb_4N_{3.92}$, $Nb_4N_3$,
$NbSi_2$, $Nb_3Si$,
MoN, $Mo_2N$,
$MoB_4$, $Mo_{0.8}B_3$, $Mo_2B$,
$MoSi_2$, $Mo_5Si_3$,
WN, $W_2N$,
$WB_4$, $W_2B_5$,
$WSi_2$, $W_5Si_3$, $W_3Si$,
TiN, $Ti_2N$, $TiN_{0.26}$, $TiN_{0.30}$,
$TiB_2$,
$TiSi_2$, TiSi, $Ti_5Si_4$, $Ti_5Si_3$,
$ZrN_{0.28}$, ZrN,
$ZrB_2$,
$ZrSi_2$, ZrSi, $Zr_5Si_3$,
$HfB_2$, $HfN_{0.40}$, HfN,
HfB,
$HfSi_2$, $Hf_5Si_4$, $Hf_2Si$, $Hf_5Si_3$, etc.)

—Crystalline Electro-Conductive Metal-Oxide Layer—

$BaRuO_3$, $SrRuO_3$, $(Ba,Sr)RuO_3$, $BaPbO_3$, $LaCuO_3$, $LaNiO_3$, $LaCoO_3$, $LaTiO_3$, $(La,Sr)CoO_3$, $(La,Sr)VO_3$, $(La,Sr)MnO_3$, $LuNiO_3$, $CaVO_3$, $CaIrO_3$, $CaRuO_3$, $CaFeO_3$, $SrVO_3$, $SrCrO_3$, $SrIrO_3$, $SrFeO_3$, $ReO_3$, and the like.

Among the materials listed above, ruthenium oxides (e.g., $RuO_2$, $BaRuO_3$, $SrRuO_3$, and $(Ba,Sr)RuO_3$) are particularly preferable, from the viewpoints of low electric conductivity, easiness in handling, and high stability in properties.

A configuration using a common electrode 46 as a bottom electrode and a signal electrode 50 as an top electrode is described in this embodiment, but the configuration is not limited thereto. Thus, a configuration using a signal electrode 50 as a bottom electrode and a common electrode 46 as an top electrode is also possible. The top electrode may have a known electrode configuration.

Hereinafter, the piezoelectric body will be described. The piezoelectric body 48 is preferably formed by a vapor- or liquid-phase growth method such as sputtering method, MOCVD (Metal-Organic Chemical Vapor Deposition) method, sol-gel method, or hydrothermal method. The vapor- or liquid-phase growth method enables the formation of piezoelectric bodies with higher density, higher accuracy, and lower cost compared with conventional mechanical formation methods of polishing and adhering a piezoelectric body after sintering.

The sputtering method is a method of forming a thin film on the surface of an object by sputtering atoms or molecules from the surface of a film-forming source (target) by ion bombardment and depositing the atoms or molecules on the object placed around the target. Alternatively, the CVD method is a method of vapor-depositing a thermally decomposed product of a vapor-phase molecule flowing over a heated substrate.

The sol-gel method is a method of forming a film by using the conversion from the sol state wherein solid fine particles are dispersed uniformly in liquid into the gel state wherein the fine particles form a three dimensional network structure by the attractive interaction generated among them.

The vapor- or liquid-phase growth methods include a method of crystallizing a piezoelectric body 48 during deposition (vapor-phase or liquid-phase growth) and a method of depositing the precursor of a piezoelectric body 48 (in the vapor or liquid phase) and then thermally crystallizing the piezoelectric body 48. In the former method, the crystalline material for piezoelectric body 48 is formed in a high-temperature atmosphere, for example, at a temperature of 500° C. or higher, while in the latter method, the precursor for the piezoelectric body 48 is formed in a low-temperature atmosphere, for example, at a temperature of 500° C. or lower. In particular, the sputtering and MOCVD methods permit crystal growth in a high-temperature atmosphere. On the other hand, in the sol-gel and aero-sol methods it is necessary to use a method of forming a precursor under a low-temperature atmosphere and then carrying out the crystallization.

The piezoelectric body 48 is formed on the common electrode 46 (bottom electrode) made of the crystalline layer described above by a vapor- or liquid-phase growth method.

The material for the piezoelectric body 48 is not particularly limited as far as it is known as a material for a piezoelectric body that can be deformed by voltage application. For example, a lead zirconate titanate (PZT)-based piezoelectric body having a relatively greater piezoelectric constant is preferably used for ejecting droplets from the viewpoint of desirable properties.

Hereinafter, as dielectric layers, the first interlayer dielectric layer 54, second interlayer dielectric layer 56, and protective layer 58 will be described. The dielectric material for these dielectric layers is not particularly limited as long as it has dielectric property, gas (oxygen) permeation resistance, and liquid resistance; but particularly when the dielectric layer is in contact with the piezoelectric body 48, the dielectric layer may increase the capacitance of the piezoelectric element 34; and thus, use of an dielectric material having a low dielectric constant, for example, a dielectric constant of 1/10 or less of that of the piezoelectric body, is preferable (the dielectric constant of the dielectric material is preferably 1 to 70, and more preferably 1 to 10). Specifically, the dielectric constant of the piezoelectric body 48 is, for example, 500 or more, and the dielectric constant of the dielectric layer should be 100 or less. Examples of the dielectric materials include inorganic dielectric materials such as silicon oxide (USG: undoped silicate glass), silicon nitride, BPSG (boro-phospho-silicate glass), FSG (fluorinated silicate glass), black diamond, FDLC (fluorinated diamond-like carbon), silicon oxide nitride, SiCO (C-doped USG), silicon carbide, tantalum oxide, aluminum oxide, zirconia oxide, titanium oxide, and the like.

A typical example of the method of producing the piezoelectric element according to the present embodiment will be described below. FIGS. 7A to 7G are process diagrams illustrating the production process for the piezoelectric element shown in FIG. 5. FIGS. 8A to 8G are process diagrams illustrating the production process for the piezoelectric element shown in FIG. 6.

Figure 7A:
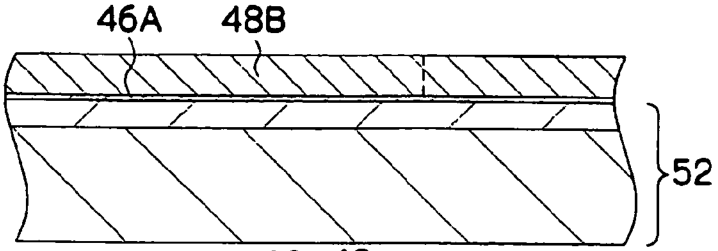
FIGS. 7A to 7G are process diagrams illustrating the production process for the piezoelectric element shown in FIG. 5.
Figure 8A:
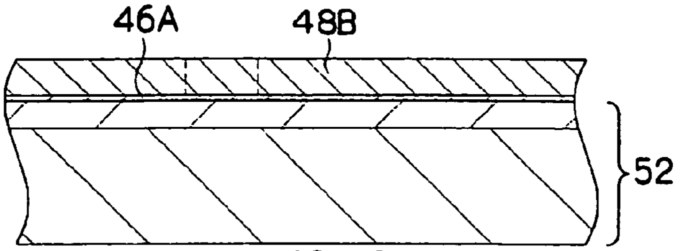
FIGS. 8A to 8G are process diagrams illustrating the production process for the piezoelectric element shown in FIG. 6.

As shown in FIGS. 7A and 8A, a crystalline layer 46A made of Ir is first formed on one side of a substrate 52 made of single crystal silicon having a thickness of 300 μm, which is doped with boron to a depth of 4.0 μm, by depositing Ti 100 Å (not shown in the figures) and Ir 2500 Å by sputtering; and then, a deposition layer 48B made of PZT (lead zirconate titanate: dielectric constant: 700) is formed by sputtering in an atmosphere at 550° C.

Figure 7B:
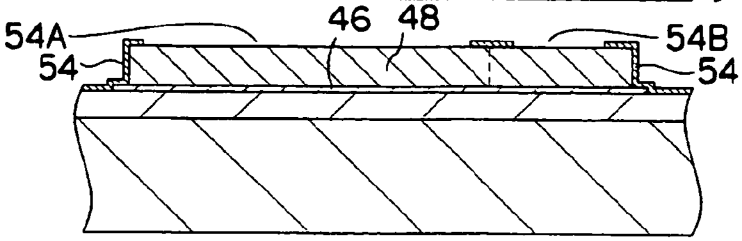
Figure 8B:
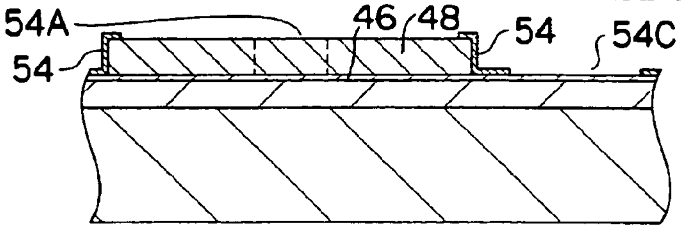

As shown in FIGS. 7B and 8B, the crystalline layer 46A and the deposition layer 48B (Ir/PZT) are then patterned by reactive ion etching (RIE) together with the deposited Ti layer not shown in the figures, to give a common electrode 46 made of the crystalline layer 46A and a piezoelectric body 48 made of the deposition layer 48B. In this embodiment, the lower-layer common electrode 46 (including the Ti layer) is patterned in a size that is larger by approximately 1 μm than the upper-layer piezoelectric body 48 by using different photomasks. Of course, the piezoelectric body 48 and the common electrode 46 may be the same in size.

The Ti layer not shown in the figures is an adsorption layer that is adsorbed to the substrate. In the figures, the common electrode 46 is patterned in a belt-shaped pattern including the active area 48A of the piezoelectric body 48, but the pattern is not limited thereto.

It is preferable that the area boundary (end face) of the piezoelectric body 48 is obliquely formed at an angle of 10 to 80° with respect to the substrate face. If the angle is 80° or more, sufficient step coverage may not be obtained, which leads to disconnection of the signal wiring 62 electrically connected to the signal electrode 50. If the angle is 10° or less, the distance between the piezoelectric bodies 48 and the distance between the piezoelectric body and the common wiring 60 may be extended, which makes it difficult to carry out high-density arrangement of the piezoelectric bodies 48.

A $SiO_2$ (dielectric constant: 1.3) layer with 5,000 Å thickness is then formed as the first interlayer dielectric layer 54 by CVD on the exposed surface (surface and side faces) of the piezoelectric body 48, the exposed surface of the common electrode 46, and the exposed surface of the substrate 52. An opening 54A for defining the active area 48A of the piezoelectric body 48 and an opening 54B as the Via area for electrical connection between the piezoelectric body 48 and the signal electrode 50 in the electrical connection area, where the signal electrode 50 and the signal wiring 62 are connected, are then formed by photolithography and etching. At the same time, an opening 54C is formed in the non-active area of the piezoelectric body 48 by etching the first interlayer dielectric layer 54 to expose the common electrode 46. A signal electrode 50 and a common wiring 60 will sequentially be deposited and patterned later on the opening 54C (exposed area of the common electrode 46). In this manner, it is possible to reduce the wiring resistance of the common electrode 46. The openings 54A and 54B are formed separately in the description above, but they may be formed as a common opening.

Figure 7C:
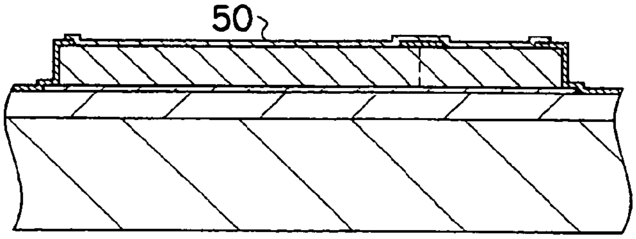
Figure 8C:
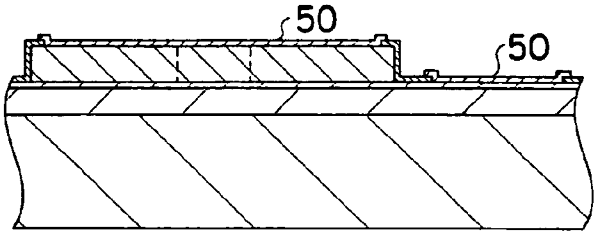

As shown in FIGS. 7C and 8C, an Ir layer with 2500 Å thickness is then deposited on the entire surface over the substrate 52, and the Ir layer is patterned by reactive ion etching to form an signal electrode 50 made of Ir. In this manner, the signal electrode 50 is connected electrically to the piezoelectric body 48 through the opening 54A (active area 48A of the piezoelectric body 48) as well as through the opening 54B. A signal electrode 50 is formed also on the common electrode 46 exposed at the opening 54C.

Figure 7D:
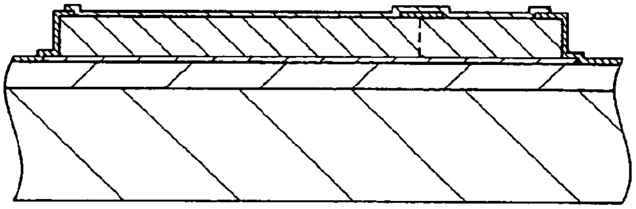
Figure 8D:
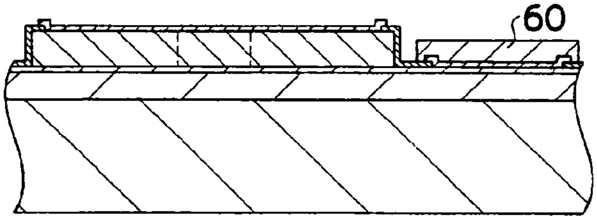

As shown in FIGS. 7D and 8D, a common wiring 60 is then formed by depositing TiNx 100 Å/Ti 100 Å/Al 5,000 Å/Ti 100 Å/TiNx 200 Å layers followed by patterning by etching to be electrically connected to the common electrode 46 via the signal electrode 50.

Figure 7E:
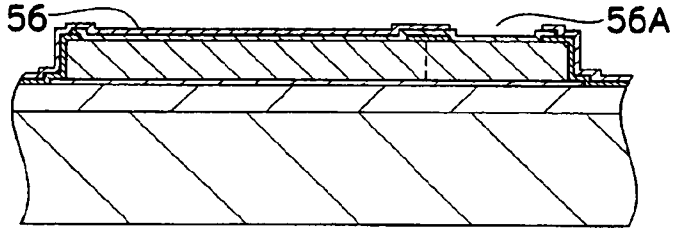
Figure 8E:
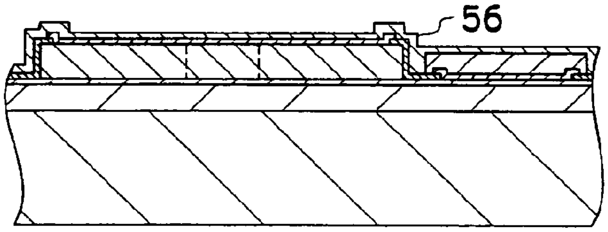

As shown in FIGS. 7E and 8E, a silicon oxide nitride SiOxNy layer with 5,000 Å thickness is then deposited as the second interlayer dielectric layer 56 by plasma CVD to cover the exposed signal electrode 50 and common wiring 60. Further, for electrical connection between the signal electrode 50 and the signal wiring 62, an opening 56A is formed by etching the second interlayer dielectric layer 56 in the non-active area of the piezoelectric body 48 to expose the signal electrode 50. The electrical connection area (opening 56A), where the signal electrode 50 and signal wiring 62 are connected, is located in the electrical connection area (opening 54B), where the piezoelectric body 48 and signal electrode 50 are connected, in the non-active area of the piezoelectric body 48.

Figure 7F:
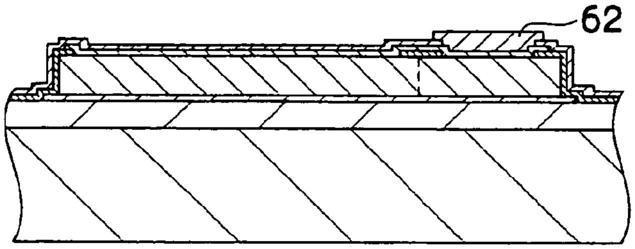
Figure 8F:
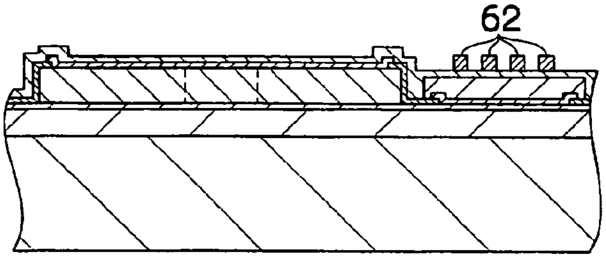
Figure 8G:
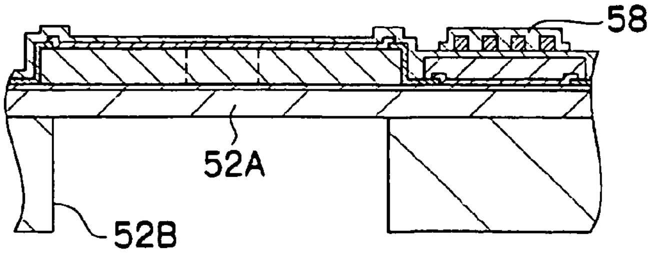

As shown in FIGS. 7F and 8F, a signal wiring 62 is then formed on the signal electrode 50 exposed at the opening 56A by depositing and patterning Ti 100 Å/Al 7000 Å layers to be connected electrically to the signal electrode 50.

The signal electrode 50 and the signal wiring 62 are electrically connected to each other in the vicinity of the active area 48A of the piezoelectric body 48. In addition, the second interlayer dielectric layer 56 is formed for interlayer separation of the common wiring 60 from the signal wiring 62 and for providing these layers respectively at different layer positions.

Figure 7G:
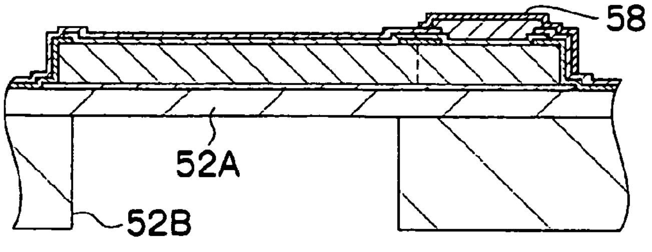

As shown in FIGS. 7G and 8Q a silicon nitride SiNx layer with 5000 Å thickness is then deposited and patterned as a protective layer 58 by plasma CVD to cover the area of the signal wiring 62.

Films deposited in the active area 48A of the piezoelectric body 48 may constrain displacement of the piezoelectric body. Thus, the protective layer 58 covers only the area of the signal wiring 62, but not the active area 48A of the piezoelectric body 48. However, the protective layer 58 may be formed on the entire surface including the active area 48A of the piezoelectric body 48.

An ink (liquid) pressure chamber 52B and a boron-diffused diaphragm 52A having a thickness of 4 μm are formed by etching the active area 48A of the piezoelectric body 48 from the rear face of the substrate 52.

In this manner, it is possible to prepare the piezoelectric element 34.

In the inkjet-recording apparatus according to the embodiment described above, the piezoelectric element 34 has a configuration wherein a first interlayer dielectric layer 54 mediates between the piezoelectric body 48 and the signal electrode 50 in the area except the active area 48A of the piezoelectric body 48, and the piezoelectric body 48 and the signal electrode 50 are connected to each other directly only in the active area 48A of the piezoelectric body 48. Thus, the active area 48A of the piezoelectric body 48 is defined accurately by the first interlayer dielectric layer 54, i.e., by the boundary of the opening 54A. Accordingly, operation of the piezoelectric body is prohibited in the area other than the active area 48A of the piezoelectric body 48. In addition, the capacitance in the area having the first interlayer dielectric layer 54 surrounding the active area 48A of the piezoelectric body 48 is smaller than the capacitance of the active area 48A having only the piezoelectric body 48 between the common electrode 46 and the signal electrode 50, whereby wasteful energy consumption can be reduced.

Further, coverage of the side face of the piezoelectric body 48 with the first interlayer dielectric layer 54 enables sufficient electrical insulation between the side face of the piezoelectric body 48 and the signal electrode 50, and prevention of discharge and short circuiting at the side face of the piezoelectric body 48, and can make the electric field applied to the piezoelectric body 48 uniform. In particular in the preparation, when a common electrode 46 (bottom electrode) and a piezoelectric body are sequentially deposited and patterned, and a signal electrode 50 (top electrode) is deposited and patterned without deposition of a first interlayer dielectric layer 54, it is difficult to etch the signal electrode 50 (top electrode) near the boundary with the piezoelectric body 48 having a thickness of about 5,000 Å to several μm. Therefore, it is effective to provide a first interlayer dielectric layer 54 between the piezoelectric body 48 and the signal electrode 50 in the area except the active area 48A of the piezoelectric body 48 and cover the side face of the piezoelectric body 48 with the first interlayer dielectric layer 54.

Also, the common electrode 46 (bottom electrode) and the signal electrode 50 (top electrode) are electrically insulated from each other by the first interlayer dielectric layer 54 to enable the piezoelectric element to function as a piezoelectric element with sufficient reliability. At the same time, the first interlayer dielectric layer 54 functions as a protective layer for the piezoelectric body 48, particularly for the side face thereof, to prevent diffusion of the constituent materials of the piezoelectric body 48 and penetration of oxygen, whereby the reliability of the piezoelectric element is drastically improved. Further, the capacitance is reduced in the area having the first interlayer dielectric layer 54 other than the active area 48A of the piezoelectric body 48, whereby the capacitance of the entire element is reduced.

The electrical connection area (opening 56A), where the signal electrode 50 and signal wiring 62 are connected, overlaps the electrical connection area (opening 54B), where the piezoelectric body 48 and signal electrode 50 are connected, in the non-active area of the piezoelectric body 48; thus, the piezoelectric body, the signal electrode, and the signal wiring have a layered structure in this area; and such a configuration allows ohmic contact and reliable electrical connection among them.

With respect to the inkjet-recording apparatus according to this embodiment, in the preparation of the piezoelectric element 34, a deposition layer 48B for the piezoelectric body 48 is formed on a crystalline layer 46A for common electrode 46 by a vapor- or liquid-phase growth method, and a common electrode 46 and a piezoelectric body 48 are formed by pattering these layers; and thus, the perovskite-phase crystallization temperature needed for piezoelectric property, i.e., the temperature needed to form the perovskite crystal phase is not raised, and also a mixed crystal of perovskite and pyrochlore phases is not formed. Further, exfoliation and cracking of the piezoelectric body do not take place. Thus, it is possible to produce the piezoelectric element 34 by deposition at low temperature without deteriorating the crystallinity and orientation of the piezoelectric body and without cracking and exfoliation thereof.

For example, when a piezoelectric body is formed by depositing a PZT ($PbZr_{(1-x)}Ti_xO_3$) material with a thickness of 5.0 μm by sputtering on an undercoat layer of face-centered cubic crystal Ir, it is possible to form a perovskite crystal phase in the tetragonal crystalline system at an atmospheric temperature of 550° C., but in contrast, an amorphous phase or a mixed crystal system of the perovskite and amorphous phases or of the perovskite and pyrochlore phases is formed on an undercoat layer of amorphous $SiO_2$ at the same atmospheric temperature, and in this case an atmospheric temperature of 620° C. is needed for growth of a single perovskite phase. This fact indicates that it is possible to produce a piezoelectric body without deteriorating the crystallinity and orientation of the piezoelectric body and also at low temperature by forming a piezoelectric body on a crystalline layer by deposition.

Similarly, when a thick piezoelectric body having a thickness of 5,000 Å or more is deposited on an amorphous $SiO_2$ layer, cracks of approximately 1.0 μm and exfoliation are generated. On the other hand, no cracks or exfoliation are generated when a crystalline layer of Ir with a thickness of 2,000 Å is previously formed on an amorphous $SiO_2$ underlayer and a thick piezoelectric body having a thickness of 5000 Å or more is deposited similarly on the crystalline layer. This fact indicates that it is possible to prevent cracking and exfoliation by forming a piezoelectric body on a crystalline layer by deposition.

Alternatively, when a PZT ($PbZr_{(1-x)}Ti_xO_3$) material with a thickness of 5.0 μm is deposited by sputtering on the crystalline layer of ruthenium oxide ($BaRuO_3$, $(Ba,Sr)RuO_3$, or $SrRuO_3$) as an undercoat layer having a thickness of 2,000 Å at an atmospheric temperature of 550° C. similarly to the above, it is possible to form a piezoelectric body in the tetragonal perovskite crystal phase and there is no cracking or exfoliation of the layer. In addition, it is found that ruthenium oxide used as the underlayer has high chemical stability, superior handling property, and high electric conductivity of several mΩcm to several 10 mΩcm, and thus, has optimum properties as the electrode for driving the piezoelectric body.

As is apparent from the findings above, it is possible to produce a piezoelectric element at low temperature without deteriorating the crystallinity and orientation of the piezoelectric body and without cracking and exfoliation, by forming a piezoelectric body on a crystalline layer by deposition.

In the first embodiment, the common electrode, the piezoelectric body, and the signal electrode are formed successively by deposition, but of course, they may be formed by laminating the constituent layers.

SECOND EMBODIMENT

Figure 9:
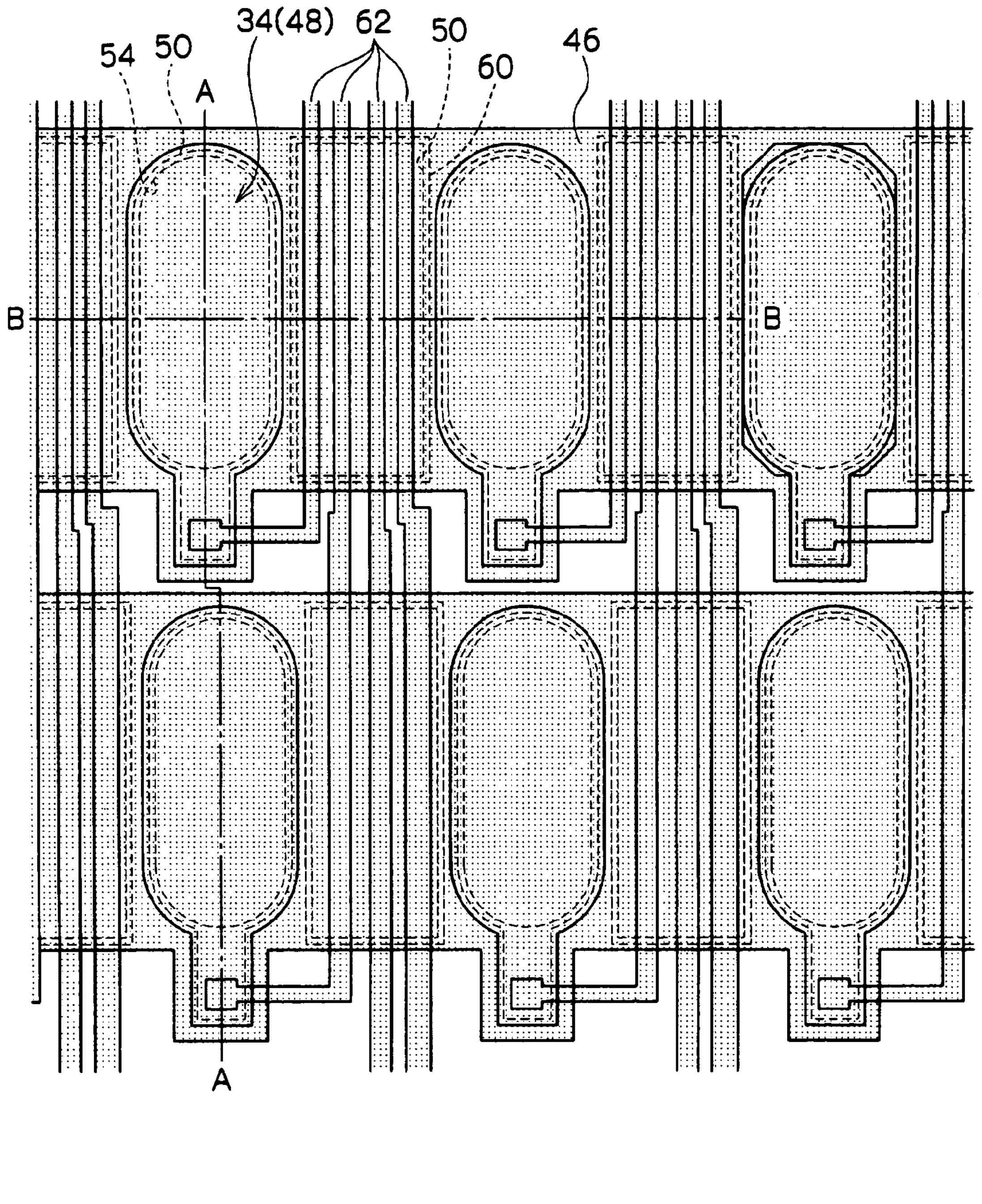
FIG. 9 is a partial magnified top view illustrating the area around the piezoelectric body in the inkjet-recording head according to the second embodiment.
Figure 10:
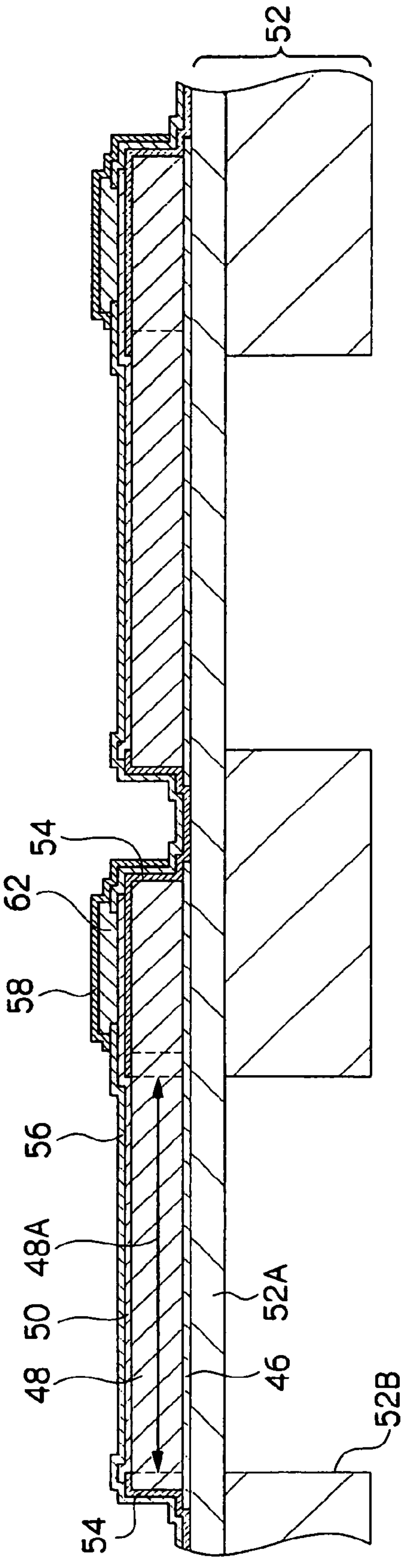
FIG. 10 is a cross-sectional view along the line A-A in FIG. 9.
Figure 11:
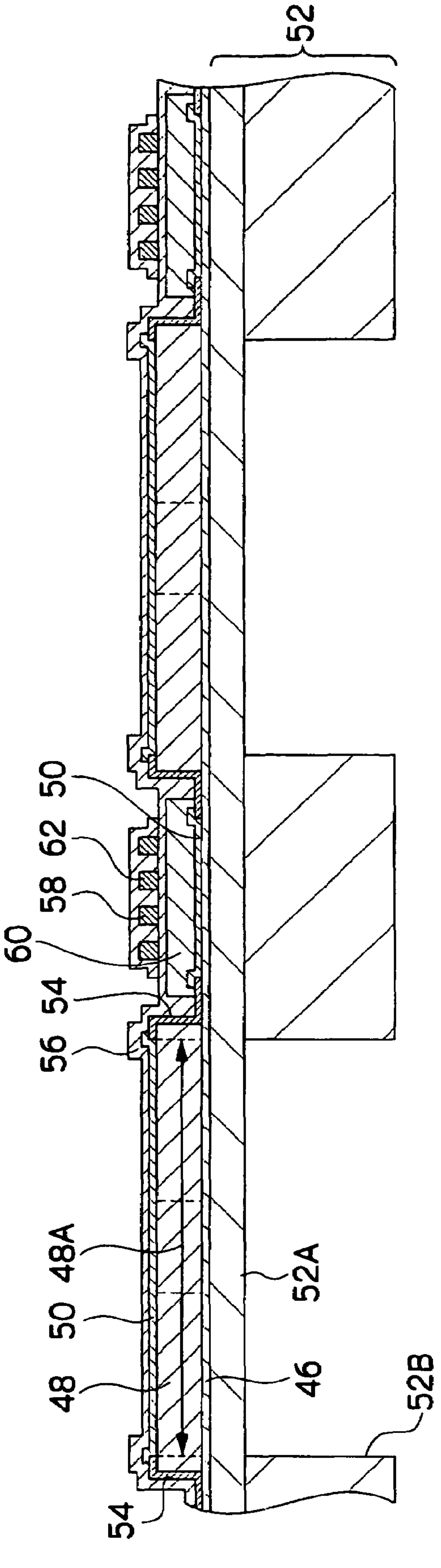
FIG. 11 is a cross-sectional view along the line B-B in FIG. 9.

FIG. 9 is a partial magnified top view illustrating the area around the piezoelectric body in the inkjet-recording head according to the second embodiment. FIG. 10 is a cross-sectional view along the line A-A in FIG. 9. FIG. 11 is a cross-sectional view along the line B-B in FIG. 9.

As shown in FIGS. 9 to 11, the inkjet-recording apparatus according to this embodiment has a configuration wherein, in the piezoelectric element 34 according to the first embodiment, no opening in the first interlayer dielectric layer 54 is formed in the electrical connection area, where the signal electrode 50 and signal wiring 62 are connected, in the non-active area of the piezoelectric body, i.e., the piezoelectric body 48 and the signal electrode 50 are not electrically connected to each other and have the first interlayer dielectric layer therebetween in the electrical connection area.

The other components are the same as those in the first embodiment, and description thereof is omitted.

Hereinafter, an example of the method of producing the piezoelectric element according to this embodiment will be described. FIGS. 1 2A to 1 2G are process diagrams showing the production process for the piezoelectric element shown in FIG. 10. FIGS. 13A to 13G are process diagrams showing the production process for the piezoelectric element shown in FIG. 11.

Figures 12A, 12B, 12C, 12D, 12E, 12F, 12G:
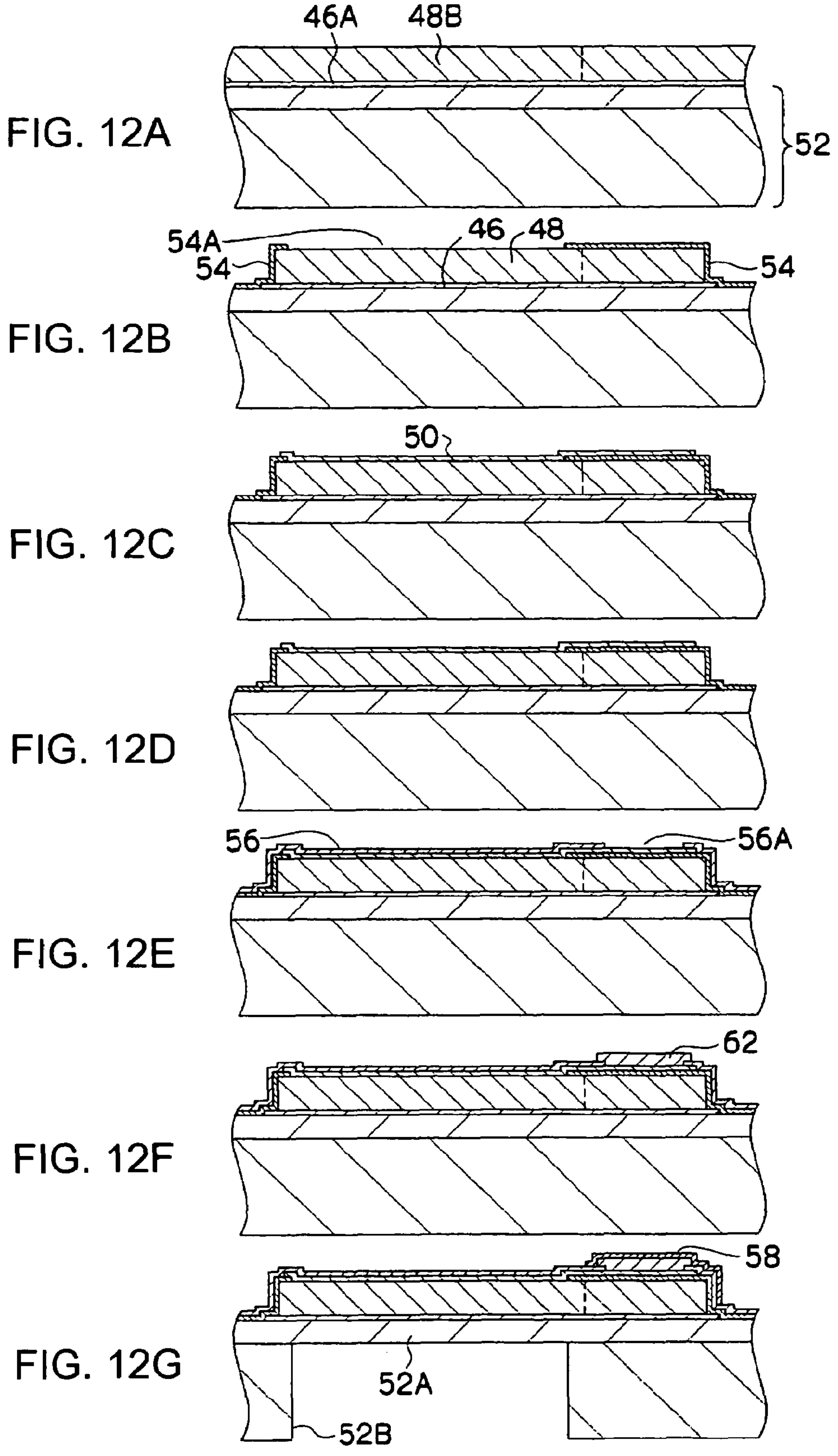
FIGS. 12A to 12G are process diagrams illustrating the production process for the piezoelectric element shown in FIG. 10.
Figures 13A, 13B, 13C, 13D, 13E, 13F, 13G:
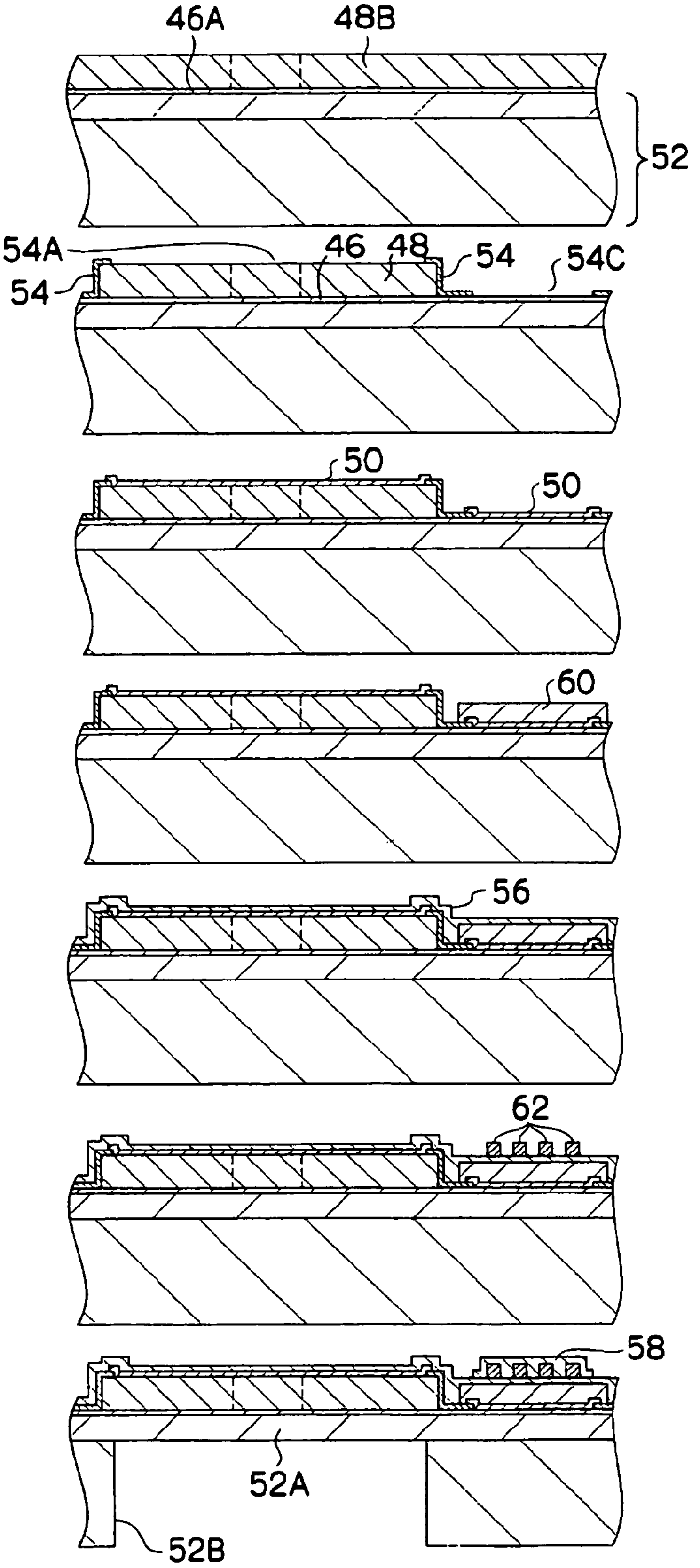
FIGS. 13A to 13G are process diagrams illustrating the production process for the piezoelectric element shown in FIG. 11.

As shown in FIGS. 12 and 13, in the method of producing the piezoelectric element according to this embodiment, in FIGS. 12B and 13B, no opening in the first interlayer dielectric layer 54 is formed in the electrical connection area, where the signal electrode 50 and signal wiring 62 are connected, in the non-active area of the piezoelectric body, i.e., the method is the same as that in the first embodiment except that no opening is formed in the electrical connection area, where the signal electrode 50 and signal wiring 62 are connected, in the first embodiment (FIGS. 7B and 8B).

In this embodiment, the piezoelectric body 48 and the signal electrode 50 are not electrically connected to each other in the electrical connection area, where the signal electrode 50 and signal wiring 62 are connected, in the non-active area of the piezoelectric body 48, and a first interlayer dielectric layer is interposed, and thus, the capacitance is decreased due to the increase in the interposition area of the first interlayer dielectric layer 54 compared with the first embodiment, whereby wasteful energy consumption is reduced.

Although a common electrode 46 (bottom electrode) having a single-layered structure of crystalline layer is described in the embodiments, the common electrode 46 (bottom electrode) may have a multi-layered structure including an amorphous layer and a crystalline layer (in this case, the piezoelectric body is deposited on the crystalline layer).

In the embodiments, an example of FWA for medium (paper) width is described, but the inkjet-recording head according to the invention is not limited thereto, and may be applied to apparatuses for the partial width array (PWA) using main- and sub-scanning mechanisms.

Also in the embodiments, an image (including character) is formed on a recording medium P, but the droplet-ejecting head and the droplet-ejecting apparatus according to the invention are not limited thereto. Thus, the recording medium is not limited to paper. The liquid to be ejected is also not limited to ink. For example, the droplet-ejecting head and the droplet-ejecting apparatus according to the invention may be used as a droplet-ejecting head and a droplet-ejecting apparatus for various industries and, for example, may be used for producing color filters for display by ejecting ink onto a polymer film or glass and for producing bumps for mounting by ejecting solder in the welding state onto a substrate.

As described above, the piezoelectric element according to the invention is a piezoelectric element including a piezoelectric body and top and bottom electrodes holding the piezoelectric body therebetween, wherein an interlayer dielectric is interposed between the piezoelectric body and the top electrode in an area other than the active area of the piezoelectric body, and the top electrode is layered directly on the piezoelectric body in the active area of the piezoelectric body.

In the piezoelectric element according to the invention, an interlayer dielectric is interposed between the piezoelectric body and the top electrode in an area other than the active area of the piezoelectric body, and the top electrode is connected directly to the piezoelectric body 48 only in the active area of the piezoelectric body. Thus, the active area of the piezoelectric body is defined accurately by the interlayer dielectric layer to thereby prevent operation of the piezoelectric body in the area other than the active area of the piezoelectric body. The capacitance in the area around the active area of the piezoelectric body, where an interlayer dielectric layer is interposed, is smaller than the capacitance in the active area where only the piezoelectric body are held between the top and bottom electrodes, whereby wasteful energy consumption can be reduced.

The piezoelectric element according to the invention can further include an upper wiring electrically connected to the top electrode, wherein an opening is provided in the interlayer dielectric at a position in the electrical connection area, where the top electrode and the upper wiring are connected, and the piezoelectric body and the top electrode are electrically connected to each other at the opening as well as in the active area of the piezoelectric body.

Alternatively, the piezoelectric element according to the invention can further include an upper wiring electrically connected to the top electrode, wherein the interlayer dielectric is interposed between the top electrode and the piezoelectric body at a position in the electrical connection area, where the top electrode and the upper wiring are connected.

In the piezoelectric element according to the invention, the interlayer dielectric is preferably formed so as to cover the side face of the piezoelectric body.

In the piezoelectric element according to the invention, the dielectric constant of the interlayer dielectric is preferably $\frac{1}{10}$ or less of that of the piezoelectric body. With such a dielectric constant, it is possible to reduce the increase in capacitance.

The piezoelectric element according to the invention preferably further includes upper and lower wirings separately which are electrically connected respectively to the top and bottom electrodes in an area other than the active area of the piezoelectric body. In this case, the upper and lower wirings are preferably provided at layer positions that are different from each other.

In the piezoelectric element according to the invention, the bottom electrode preferably includes a crystalline layer. In addition, the crystalline layer is preferably made of a ruthenium oxide. Further, the piezoelectric body is preferably formed by a vapor- or liquid-phase growth method.

The droplet-ejecting head according to the invention includes the piezoelectric element according to the invention. In the droplet-ejecting head according to the invention, a plurality of the piezoelectric elements may be arranged in a grid pattern.

The droplet-ejecting apparatus according to the invention includes the droplet-ejecting head according to the invention.

The first method of producing a piezoelectric element according to the invention includes: forming an electro-conductive crystalline layer, forming a deposition layer on the crystalline layer by a vapor- or liquid-phase growth method, and patterning the crystalline layer and the deposition layer, to thereby sequentially form a bottom electrode made of the crystalline layer and a piezoelectric body made of the deposition layer; forming an interlayer dielectric layer on the bottom electrode and the piezoelectric body followed by patterning an opening in the interlayer dielectric layer at a position in the active area of the piezoelectric body; and forming an electro-conductive layer on the interlayer dielectric layer as well as on the piezoelectric body exposed at the opening of the interlayer dielectric layer followed by patterning the electro-conductive layer to form an top electrode made of the electro-conductive layer.

Alternatively, the second method of producing a piezoelectric element according to the invention includes: forming an electro-conductive crystalline layer, forming a deposition layer on the crystalline layer by a vapor- or liquid-phase growth method, and patterning the crystalline layer and the deposition layer, to thereby sequentially form a bottom electrode made of the crystalline layer and a piezoelectric body made of the deposition layer; forming an interlayer dielectric layer on the bottom electrode and the piezoelectric body followed by patterning an opening in the interlayer dielectric layer at a position in the active area of the piezoelectric body as well as an opening in the interlayer dielectric layer at a position in an electrical connection area where an top electrode is to be connected to a wiring; and forming an electro-conductive layer on the interlayer dielectric layer as well as on the piezoelectric body exposed at the openings of the interlayer dielectric layer followed by patterning the electro-conductive layer to form the top electrode made of the electro-conductive layer.

In the first and second methods of producing a piezoelectric element, a deposition layer is formed on a crystalline layer by a vapor- or liquid-phase growth method, and a piezoelectric body is formed by pattering the deposition layer. Therefore, the perovskite-phase crystallization temperature needed for piezoelectric property, i.e., the temperature needed to form the perovskite crystal phase is not raised, and also a mixed crystal of perovskite and pyrochlore phases is not generated. Further, exfoliation and cracking of the piezoelectric body do not take place.

Therefore, the invention can provide a piezoelectric element which reduces wasteful energy consumption. Also, the invention can provide a method of producing a piezoelectric element, which allows formation of a uniform piezoelectric body by deposition at low temperature without exfoliation or cracking.

What is claimed is:

1. A piezoelectric element comprising a piezoelectric body and top and bottom electrodes holding the piezoelectric body therebetween, wherein an interlayer dielectric having an opening that defines an active area of the piezoelectric body is interposed between the piezoelectric body and the top electrode, and the top electrode is layered directly on the piezoelectric body in the active area of the piezoelectric body.

2. The piezoelectric element according to claim 1, further comprising an upper wiring electrically connected to the top electrode, wherein an opening is provided in the interlayer dielectric at a position in the electrical connection area, where the top electrode and the upper wiring are connected, and the piezoelectric body and the top electrode are electrically connected to each other at the opening as well as in the active area of the piezoelectric body.

3. The piezoelectric element according to claim 1, further comprising an upper wiring electrically connected to the top electrode, wherein the interlayer dielectric is interposed between the top electrode and the piezoelectric body at a position in the electrical connection area, where the top electrode and the upper wiring are connected.

4. The piezoelectric element according to claim 1, wherein the interlayer dielectric is formed so as to cover the side face of the piezoelectric body.

5. The piezoelectric element according to claim 1, wherein the dielectric constant of the interlayer dielectric is $\frac{1}{10}$ or less of that of the piezoelectric body.

6. The piezoelectric element according to claim 1, further comprising upper and lower wirings separately which are electrically connected respectively to the top and bottom electrodes in an area other than the active area of the piezoelectric body.

7. The piezoelectric element according to claim 6, wherein the upper and lower wirings are provided at layer positions that are different from each other.

8. The piezoelectric element according to claim 1, wherein the bottom electrode includes a crystalline layer.

9. The piezoelectric element according to claim 8, wherein the crystalline layer is made of a ruthenium oxide.

10. The piezoelectric element according to claim 8, wherein the piezoelectric body is formed by a vapor- or liquid-phase growth method.

11. A droplet-ejecting head comprising the piezoelectric element according to claim 1.

12. The droplet-ejecting head according to claim 11, wherein a plurality of the piezoelectric elements are arranged in a grid pattern.

13. A droplet-ejecting apparatus comprising the droplet-ejecting head according to claim 11.

* * * * *